(12) United States Patent
White

(10) Patent No.: US 11,183,760 B2
(45) Date of Patent: Nov. 23, 2021

(54) ACTIVE VIVALDI ANTENNA

(71) Applicant: HRL Laboratories, LLC, Malibu, CA (US)

(72) Inventor: Carson R. White, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 86 days.

(21) Appl. No.: 16/554,260

(22) Filed: Aug. 28, 2019

(65) Prior Publication Data

US 2020/0099132 A1   Mar. 26, 2020

Related U.S. Application Data

(60) Provisional application No. 62/734,881, filed on Sep. 21, 2018.

(51) Int. Cl.
*H01Q 5/335* (2015.01)
*H01Q 21/28* (2006.01)
*H01Q 5/50* (2015.01)

(52) U.S. Cl.
CPC ............ *H01Q 5/335* (2015.01); *H01Q 5/50* (2015.01); *H01Q 21/28* (2013.01)

(58) Field of Classification Search
CPC .......... H01Q 5/335; H01Q 21/28; H01Q 5/50; H01Q 23/00; H01Q 13/085
USPC ........................................................ 343/860
See application file for complete search history.

(56) References Cited

U.S. PATENT DOCUMENTS

| | | | |
|---|---|---|---|
| 6,137,453 A | 10/2000 | Johnson | |
| 8,502,735 B1 | 8/2013 | Moosbrugger | |
| 8,639,203 B2 * | 1/2014 | Robert | H03H 11/30 |
| | | | 455/269 |
| 8,754,817 B1 | 6/2014 | Kuo | |
| 9,077,066 B1 | 7/2015 | Lee | |
| 10,177,430 B2 * | 1/2019 | Xue | H01P 1/383 |
| 10,276,919 B2 * | 4/2019 | Diebold | H01Q 9/285 |
| 10,446,936 B2 * | 10/2019 | Henry | H04B 3/58 |
| 10,659,010 B1 * | 5/2020 | Patel | H04B 1/18 |
| 10,714,839 B2 | 7/2020 | White | |

(Continued)

FOREIGN PATENT DOCUMENTS

| KR | 10-1083050 B1 | 11/2011 |
|---|---|---|
| KR | 10-1212219 B1 | 12/2012 |

OTHER PUBLICATIONS

PCT International Preliminary Report on Patentability (Chapter II) from PCT/US2019/048907 dated Sep. 15, 2020.

(Continued)

*Primary Examiner* — Don P Le
(74) *Attorney, Agent, or Firm* — Ladas & Parry

(57) ABSTRACT

An antenna system having a Vivaldi antenna configured to be impedance matched to antenna impedance Za at and above but not below a frequency fc; a Field-Effect-Transistor buffer coupled to the Vivaldi antenna, the length of the coupling between the antenna terminals and the buffer being of a distance much less than a wavelength at frequency fc, the buffer configured to present a high impedance at frequencies substantially <fc, the buffer output impedance further configured to be matched to a system impedance Z0 at frequencies both above and below fc.

20 Claims, 15 Drawing Sheets

(56) References Cited

U.S. PATENT DOCUMENTS

| | | | |
|---|---|---|---|
| 2003/0011520 A1* | 1/2003 | Lee | H01Q 9/28 |
| | | | 343/700 MS |
| 2005/0012672 A1 | 1/2005 | Fisher | |
| 2007/0293150 A1 | 12/2007 | Exal | |
| 2010/0182096 A1* | 7/2010 | Kim | H01P 5/10 |
| | | | 333/26 |
| 2011/0261866 A1 | 10/2011 | Chang | |
| 2011/0267248 A1* | 11/2011 | Remski | H01Q 21/06 |
| | | | 343/770 |
| 2012/0068912 A1 | 3/2012 | Bradley | |
| 2012/0081184 A1* | 4/2012 | Pesetski | B82Y 10/00 |
| | | | 330/310 |
| 2013/0063299 A1 | 3/2013 | Proudkii | |
| 2013/0157713 A1 | 6/2013 | Stolarczyk | |
| 2013/0183917 A1* | 7/2013 | Asuri | H03F 1/02 |
| | | | 455/127.5 |
| 2014/0210668 A1 | 7/2014 | Wang | |
| 2014/0327590 A1 | 11/2014 | Meharry | |
| 2015/0270620 A1 | 9/2015 | Inoue | |
| 2016/0056544 A1* | 2/2016 | Garcia | H01Q 1/38 |
| | | | 343/725 |
| 2017/0338848 A1 | 11/2017 | Sharma | |
| 2018/0054185 A1* | 2/2018 | Hu | H03H 11/28 |
| 2018/0062250 A1 | 3/2018 | Lavin | |
| 2018/0254562 A1 | 9/2018 | Dobric | |
| 2019/0252787 A1* | 8/2019 | McGrath | H01Q 21/064 |

OTHER PUBLICATIONS

From U.S. Appl. No. 16/554,274 (now published as U.S. Pat. No. 10,714,839), Notice of Allowance dated Mar. 9, 2020.

U.S. Appl. No. 16/554,274, White, filed Aug. 28, 2019.

Lee et al. "A low profile wide-band (5:1) dual-pol array,"IEEE Antennas and Wireless Propagation Letters, vol. 2, 2003.

Lee, J. J., et al. "Wide band bunny-ear radiating element," *Proceedings of IEEE Antennas and Propagation Society International Symposium*, Ann Arbor, MI, USA, 1993, pp. 1604-1607, vol. 3.

https://www2.13t.com/randtron/antenna_products/elements_dual_polarization_sinuous.htm (Printed: Nov. 27, 2019).

PCT International Search Report and Written Opinion from PCT/US2019/048906 dated Dec. 19, 2019.

PCT International Search Report and Written Opinion from PCT/US2019/048907 dated Dec. 19, 2019.

PCT International Preliminary Report on Patentability (Chapter II) from PCT/US2019/048906 dated Oct. 22, 2020.

\* cited by examiner

Traditonal Passive
Vivaldi Antenna

Present Disclosure:
Active Vivaldi
Receive Antenna

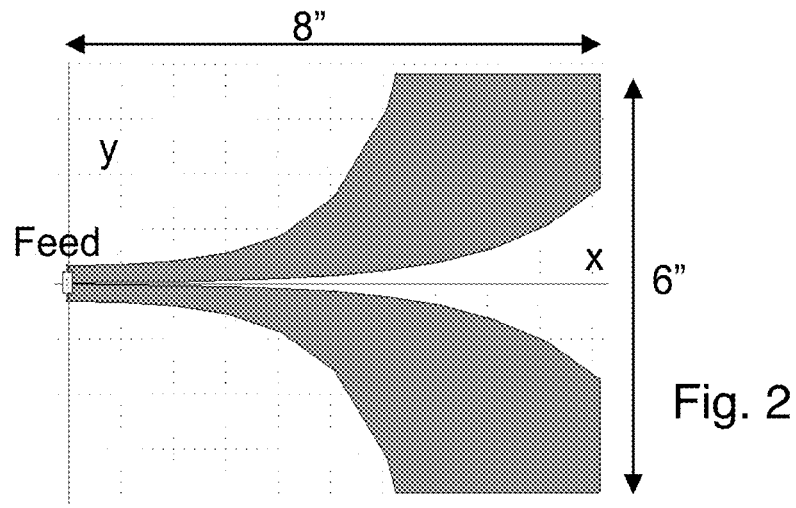
Fig. 2
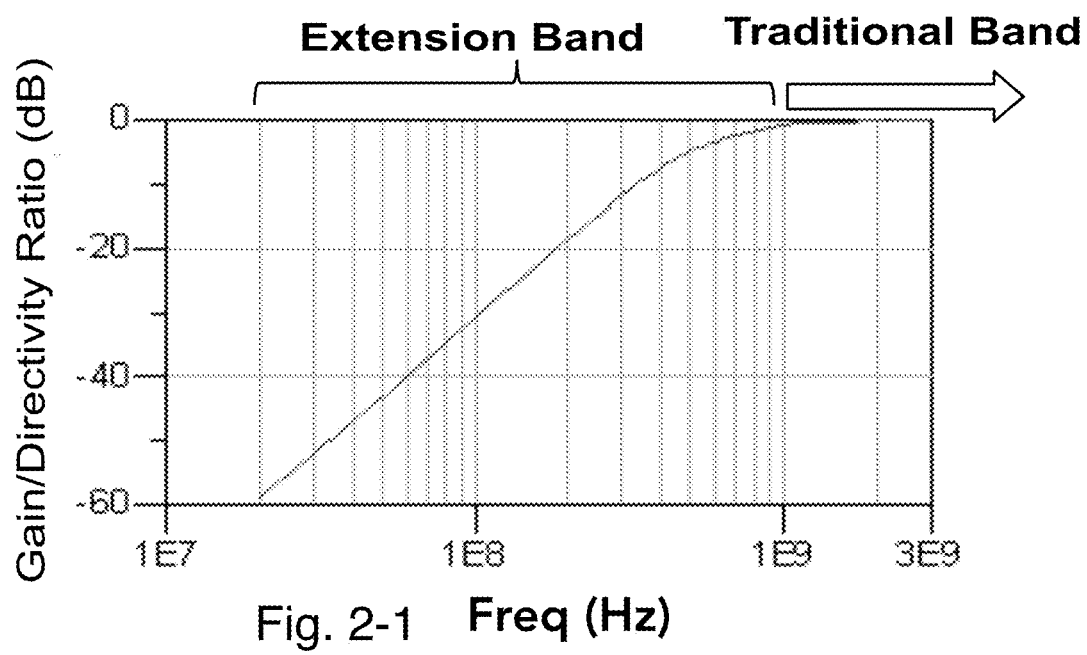
Fig. 2-1  Freq (Hz)

US 11,183,760 B2

ACTIVE VIVALDI ANTENNA

CROSS REFERENCE TO RELATED APPLICATIONS

This application claims the benefit of U.S. Provisional Patent Application Ser. No. 62/734,881 filed 21 Sep. 2018 and entitled "Active Vivaldi Antenna", the disclosure of which is hereby incorporated herein by reference.

This application is also related to U.S. Provisional Patent Application Ser. No. 62/734,885 filed 21 Sep. 2018 and entitled "Active Wideband Antenna" and its related Non Provisional application Ser. No. 16/554,274 filed on the same day as this application and entitled "Active Wideband Antenna", the disclosures of which are hereby incorporated herein by reference.

STATEMENT REGARDING FEDERALLY SPONSORED RESEARCH OR DEVELOPMENT

None.

TECHNICAL FIELD

Active Vivaldi antennas.

BACKGROUND

Passive Vivaldi antennas typically have approximately a 10:1 bandwidth and require a large size to function well at low frequencies. See, for example, Lee et al. "A low profile wide-band (5:1) dual-pol array," IEEE AWPL, vol. 2, 2003 and J. J. Lee and S. Livingston, "Wide band bunny-ear radiating element," Proceedings of IEEE Antennas and Propagation Society International Symposium, Ann Arbor, Mich., USA, 1993, pp. 1604-1607 vol. 3. Active monopole and dipole antennas use buffer amplifiers, but they only operate up to about the first resonance of the dipole antennas. Therefore, their high frequency bandwidth is limited.

BRIEF DESCRIPTION OF THE INVENTION

In one aspect, the invention provides a wideband Vivaldi type receive antenna that operates both in the "traditional band" of operation, where the size is $>=\frac{1}{2}$ wavelength ($\lambda$) at the minimum frequency and a low-frequency "extension band," where the size is $<\lambda/2$. The Active Vivaldi of the present invention comprises a Vivaldi antenna with a balanced feed (one example is a Bunny Ear antenna) and a differential buffer amplifier integrated directly into each feed point of the Vivaldi antenna. "Directly into each feed" means that any transmission lines used to connect the arms of the antenna to the buffers is as short as possible and is certainly less than a quarter wavelength in length for any frequency in the extension band and preferably less than $\frac{1}{10}$ of a wavelength in length for any frequency in the extension band. With such a short length, there is no space for an impedance matching device (such as a balun) nor would be one desirable between the antenna feed points and the differential buffer amplifiers. Instead, each differential buffer amplifier preferably is configured to have a high impedance input in the extension band (i.e. much higher than the impedance of the antenna in the traditional band). In some embodiments, the buffer amplifier's input impedance is also high in the traditional band, while in others the buffer amplifier is impedance matched to the antenna in the traditional band preferably by using a feedback circuit. The buffers each preferentially comprise one or more FET transistors and more preferably one or more Gallium Nitride (GaN) FETs and the buffers may be arranged with either a differential or single ended output. The buffer's output is impedance matched to an interface impedance (typically 50, 75 or 100 Ohms) over both the traditional and extension bands.

In another aspect, the invention provides a receive antenna with wider bandwidth than is possible with state of the art antennas without increasing the size thereof. Traditional Vivaldi antennas operate over a 10:1 bandwidth and are between $0.5\lambda$ and $1\lambda$ in size at the minimum frequency. For example, an antenna operating from 1-10 GHz would be ~6" or more in size. Increasing the bandwidth requirement to 0.1-10 GHz would mean increasing the size to ~60" (and would introduce additional design challenges to maintain the impedance match), or would force the user to accept severely degraded receive sensitivity (i.e. minimum detectable signal) over the 0.1-1 GHz extension band. This invention may allow operation over 0.1-10 GHz with a 6" size without severely degrading the sensitivity.

In yet another aspect, the invention provides a Vivaldi antenna configured to be impedance matched to antenna impedance Za (which is typically a real impedance) at and above but not below a frequency fc (at frequencies well below fc the Vivaldi antenna preferably has a reactive impedance whose absolute value is typically greater than Za); a Field-Effect-Transistor buffer coupled to said Vivaldi antenna, the length of said coupling between the antenna terminals and the buffer a distance much less than a wavelength at frequency fc, the buffer configured to present a high input impedance at frequencies substantially <fc, the buffer output impedance further configured to be matched to a system impedance Z0 at frequencies both above and below fc, fc being a frequency which defines a boundary between the extension band and the traditional band.

In still yet another aspect, the invention provides a Vivaldi antenna system having a pair of antenna arms of a Vivaldi shaped antenna, the antenna arms diverging from each other as they emanate from proximate ends at an antenna throat, a buffer amplifier comprising at least a pair of transistorized amplifiers, the buffer amplifier being embodied in an IC chip and the IC chip being directly bonded to the proximate ends of the antenna arms at said antenna throat, the control electrodes of each of the pair of said transistorized amplifiers being coupled to the Vivaldi shaped antenna.

In yet another aspect, the invention provides a Vivaldi antenna system comprising a Vivaldi type receive antenna that operates both in a "traditional band" of operation, where a size of the Vivaldi type receive antenna is $>=\frac{1}{2}$ wavelength ($\lambda$) at a minimum frequency in said "traditional band" of operation and a low-frequency "extension band," where the size of the Vivaldi type receive antenna is $<\lambda/2$, a buffer amplifier having at least a pair of FET amplifiers, the pair of FET amplifiers each having a gate (or gate electrode) directly coupled to an arm of the Vivaldi type receive antenna, each of the pair of FET amplifiers having an input impedance which is much higher than a characteristic impedance of the Vivaldi type receive antenna in the extension band.

In still yet another aspect, the present invention provides a Vivaldi receive antenna system comprising a pair of antenna arms of a Vivaldi shaped antenna, wherein the antenna arms diverge from each other as they emanate from proximate ends at an antenna throat, and an integrated circuit (IC) chip directly bonded at or adjacent the proximate ends of the antenna arms at the antenna throat, the IC chip including a buffer amplifier, the buffer amplifier including one or more amplifier input electrodes associated therewith, the amplifier input electrodes being operatively coupled directly to the antenna arms of the Vivaldi shaped antenna.

BRIEF DESCRIPTION OF THE DRAWINGS

FIG. 3-1 depicts a cross sectional view of a FET of a buffer amplifier which is disposed very close to the proximate end of an arm of a Vivaldi antenna in accordance with one embodiment of the presently disclosed technology.

FIGS. 3(a) and 3(b) have high impedance inputs and no feedback; FIGS. 3(c) and 3(d) incorporate a high-pass feedback circuit comprising a capacitor C and a resistor R to provide an input impedance that is a high impedance in the low-frequency extension band and is matched to the antenna impedance in the high frequency traditional band. FIGS. 3(a) and 3(c) have differential outputs, while FIGS. 3(b) and 3(d) employ transformer coupling (via a transformer T) to provide single-ended outputs. The currently preferred embodiment is depicted by FIG. 3(d).

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to (i) all papers and documents which are filed concurrently with this specification and which are open to public inspection with this specification (the contents of all such papers and documents are incorporated herein by reference) and (ii) all papers and documents which are otherwise incorporated by reference herein (but not physically filed with this specification).

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph (f). In particular, the use of "step of" or "act of" in the claims herein is not intended to invoke the provisions of 35 U.S.C. 112, Paragraph (f).

Figure 1A:
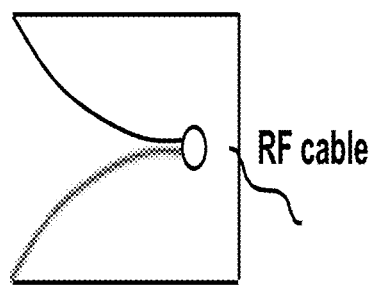
FIGS. 1a and 1b depict Vivaldi antennas according to the prior art (FIG. 1a) and according to the present disclosure (FIG. 1b).
Figure 1B:
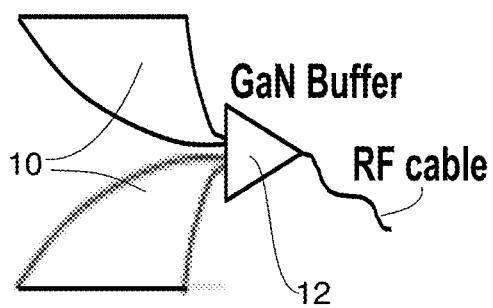
Figure 3:
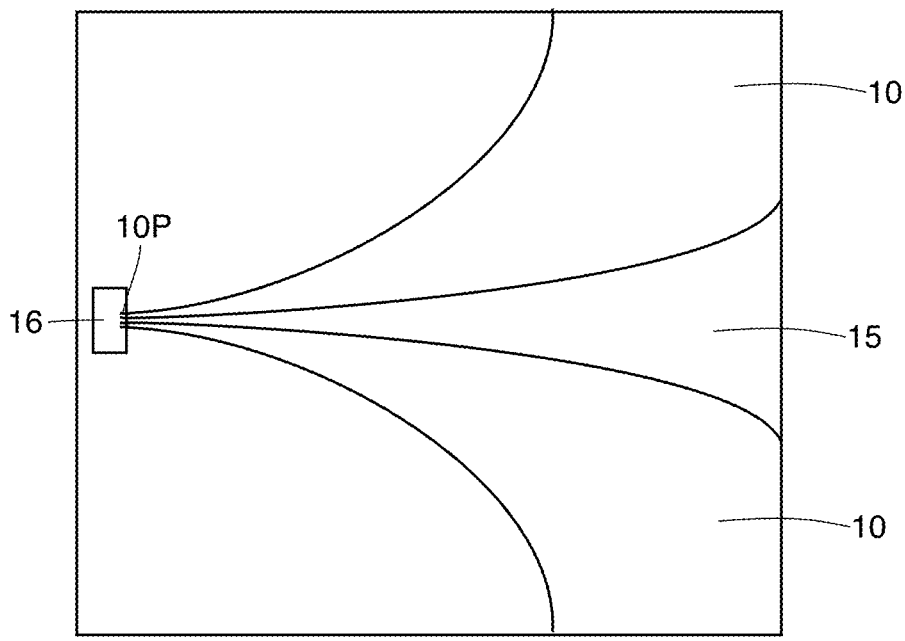
FIG. 3 shows an improved Vivaldi antenna having buffer amplifiers on an IC chip disposed as close as reasonably possible to the proximate ends of the arms of a Vivaldi antenna.

FIG. 1a shows a Vivaldi antenna according to the prior art and FIGS. 1b and 3 show an Active Vivaldi according to embodiments of the present invention. In the prior art, a passive Vivaldi can have either a microstrip or stripline feed (as shown in FIG. 1a) or can have be a "bunny-ear" shape or configuration (see the Vivaldi antenna 10 of FIG. 1b). The Vivaldi antenna 10 has a pair of arms each labeled with reference numeral 10 in FIG. 3 which emanate from a throat region at the antenna's feed point 10P. The presently disclosed technology differs from the prior art by integrating a FET buffer amplifier 12 directly onto or at the antenna feed 10P of the balanced arms 10 of the Vivaldi antenna as shown in FIGS. 1b and 3.

Figure 2:
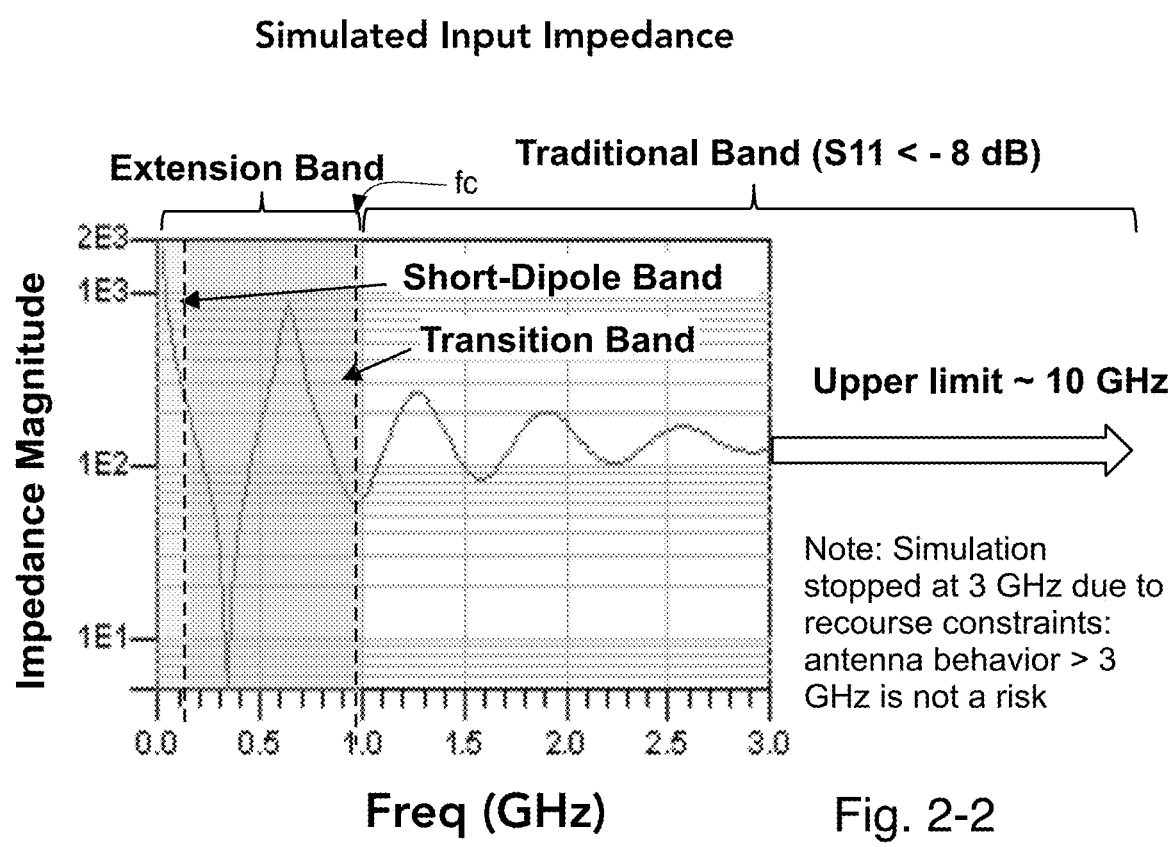
FIG. 2 shows a prior art passive Vivaldi antenna of one possible size and FIGS. 2-1 and 2-2 show simulations of the passive Vivaldi antenna of FIG. 2 and also show a boundary frequency fc between the extension band and the traditional band mentioned above.
Figures 1, 3:
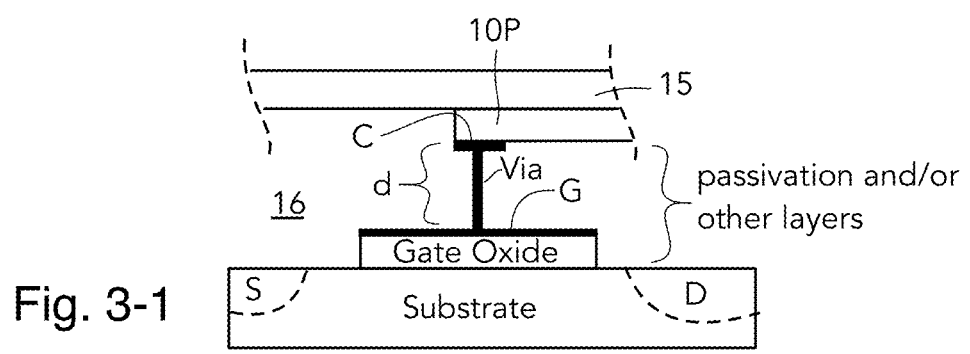
Figure 3A:
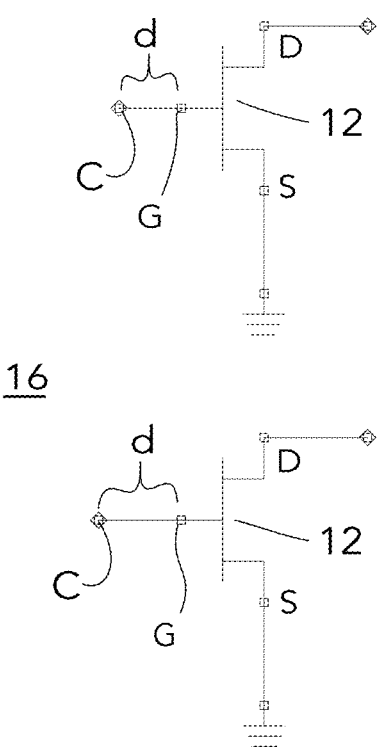
FIGS. 3(a)-3(d) depict simplified schematics of four embodiments of a GaN buffer amplifier (bias networks for the buffer amplifiers are not shown).
Figure 3B:
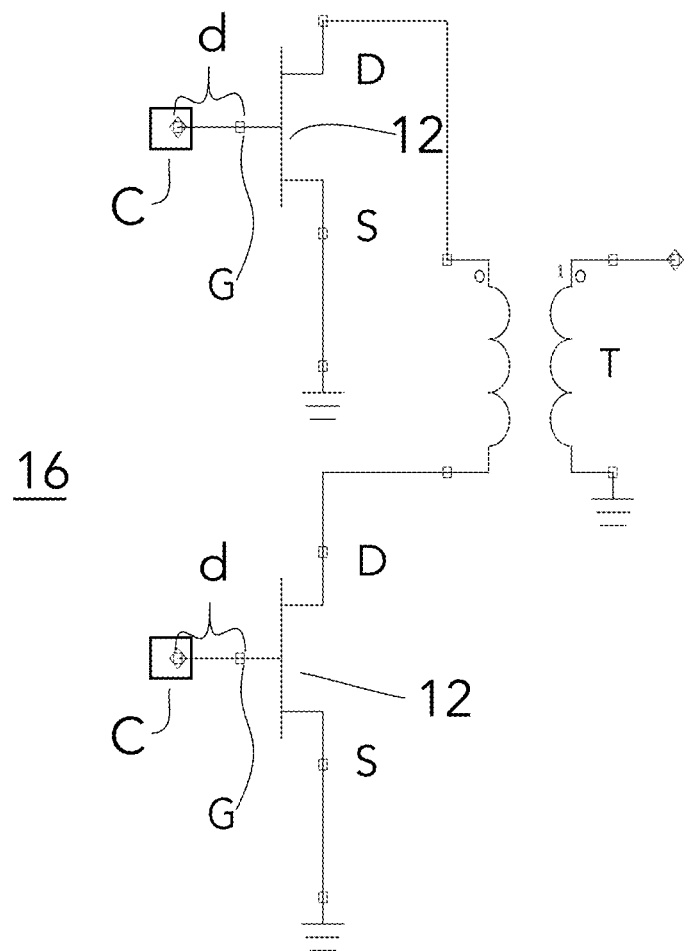

The simulated performance of a Vivaldi antenna in accordance with the prior art is shown in FIGS. 2-1 and 2-2 for a prior art Vivaldi antenna sized as shown in FIG. 2. Over 1-3 GHz, the antenna is well matched to 150 Ohms (see FIG. 2-2) and the total efficiency is near 0 dB (see FIG. 2-1). This performance likely extends all the way to 10 GHz or more, but the simulation was terminated at 3 GHz due to resource constraints. Below 1 GHz, the impedance match deteriorates and the total efficiency drops by 40 dB/decade. Between 200 MHz and 1 GHz, the impedance varies between series and parallel resonances. However, between 20 and 200 MHz, the impedance behaves as a small capacitance, similar to a short dipole. We deem this band the "short dipole" band and the 200 MHz-1 GHz, the "transition" band for this antenna. The "short dipole" band and the "transition" band together form the "extension" band.

In the prior art, the Vivaldi antenna of FIG. 2 would be considered unusable in the transition and short dipole bands (collectively the "extension band") due to its widely fluctuating impedance, so its use would be confined to the traditional band where S11 is less than −8 dB. The active Vivaldi antenna of FIG. 3 on the other hand may be used in the transition (and preferably in the extension band as well) by utilizing and locating a buffer amplifier 12 as disclosed herein.

Four possible embodiments of the buffer amplifier 12 are shown in FIGS. 3(a)-3(d). In the first embodiment (FIG. 3(a)), the buffer amplifier 12 comprises a pair of a differential common-source amplifiers each directly coupled to one of the balanced feed terminals of the Vivaldi antenna. This connection may with a transmission line matched to the antenna impedance in the traditional band, but may also be made with another arrangement of two conductors (e.g. wires or traces not arranged in a conventional transmission line). The length d of this connection between the antenna terminals and the FET transistor in buffer 12 shall be «the wavelength at the highest frequency of the extension band (which is 1 GHz in this example . . . see FIG. 2-2). The sources of the two transistors connected to a common ground node, and the differential output is taken to the receiver or, optionally, a second amplification stage (not shown). A modification to this embodiment provides a single ended output by means of a transformer (FIG. 3(b)).

Figure 3C:
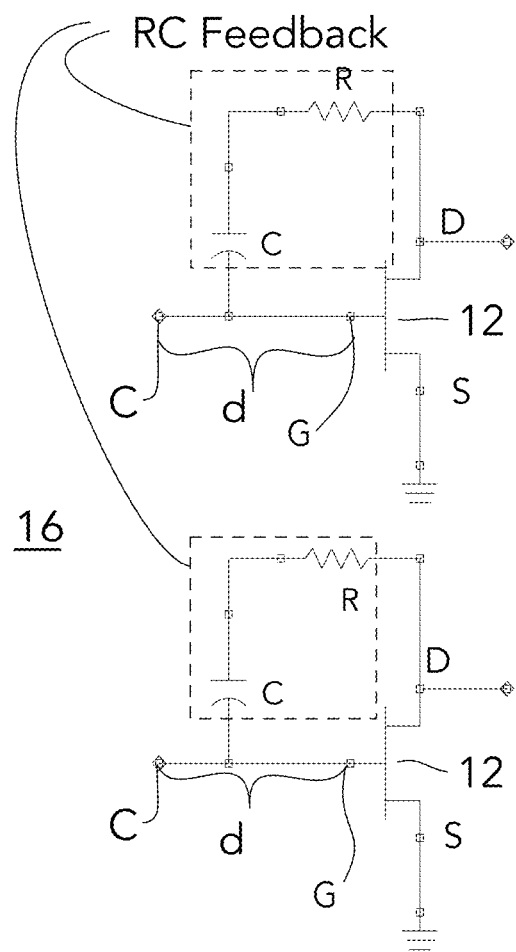
Figure 3D:
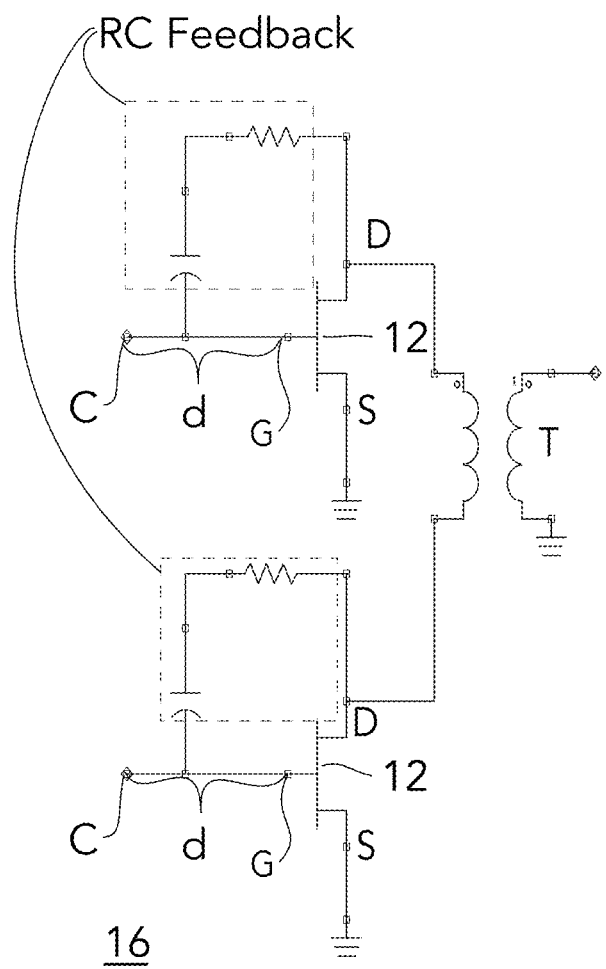

The preferred embodiments of buffer amplifier 12 (see FIGS. 3(c) and 3(d)) incorporate feedback network comprising a resistor R and a capacitor C to realize a buffer that has high input impedance in the extension band and matched to the antenna impedance in the traditional band. The output impedance of the amplifier 12 is preferably set to a system impedance (Z0) which might well be equal to 50 ohms in many embodiments. A high-pass network (shown in dashed lines on FIGS. 3(c) and 3(d)) is comprised, in one embodiment, of a resistor R in series with a capacitor C (500 Ohms and 2 pF in one example or embodiment) which couples the drain D to the gate G of the FET transistors. A goal is to design the buffer amplifier 12 such that above a RC cutoff frequency of the feedback network, the input impedance and the optimum noise impedance are both close to the antenna impedance. A second goal is to design the RC cutoff frequency such that the feedback is minimized in the extension band, while maintaining amplifier stability and a relatively high input impedance compared to antenna impedance in the extension band.

The arms 10 of the Vivaldi antenna may defined from metal on a printed circuit board or other dielectric substrate 15 as shown in FIGS. 3 and 3-1, and an IC chip 16 including a buffer amplifier 12 (preferably with at least two FET buffer amplifiers as depicted by FIGS. 3(a)-3(d)), is disposed on the substrate 15 so that contacts C of the chip 16 are bonded directly at the feed points at the proximate ends 10P of the arms 10 of the Vivaldi antenna and are very closely arranged with respect to the gate(s) G of the FET amplifier(s) in buffer amplifier(s) 12. Transmission lines, which may be formed by a Via of length d, for example, disposed between the feed points at the ends 10P of the arms 10 of the Vivaldi antenna (at contact C) and gates G are preferably maintained as short as reasonably possible by forming the gates G of the FET amplifiers next to the aforementioned chip contacts C. One FET device is shown a cross sectional view in FIG. 3-1 having a vertical metallic Via coupling a metallic gate G of the FET to a proximate end 10P of one arm 10 of the Vivaldi antenna at contact C. A second FET would be similarly arranged with respect to the other arm 10 of the Vivaldi antenna. The distance d shown in FIGS. 3(a)-3(d) and 3-1 should be as short as possible and the proximate ends (or feed points) 10P of the arms 10 of the Vivaldi antenna are preferably coupled immediately at contacts C. If the FET amplifiers have more than one stage, then it is the gates G of the first stage which are preferably arranged next to the aforementioned contacts C.

The length d of the transmission line (which may be embodied by a via, for example) is much less than a wavelength at frequency fc and preferably is as short as reasonably possible.

Figure 4:
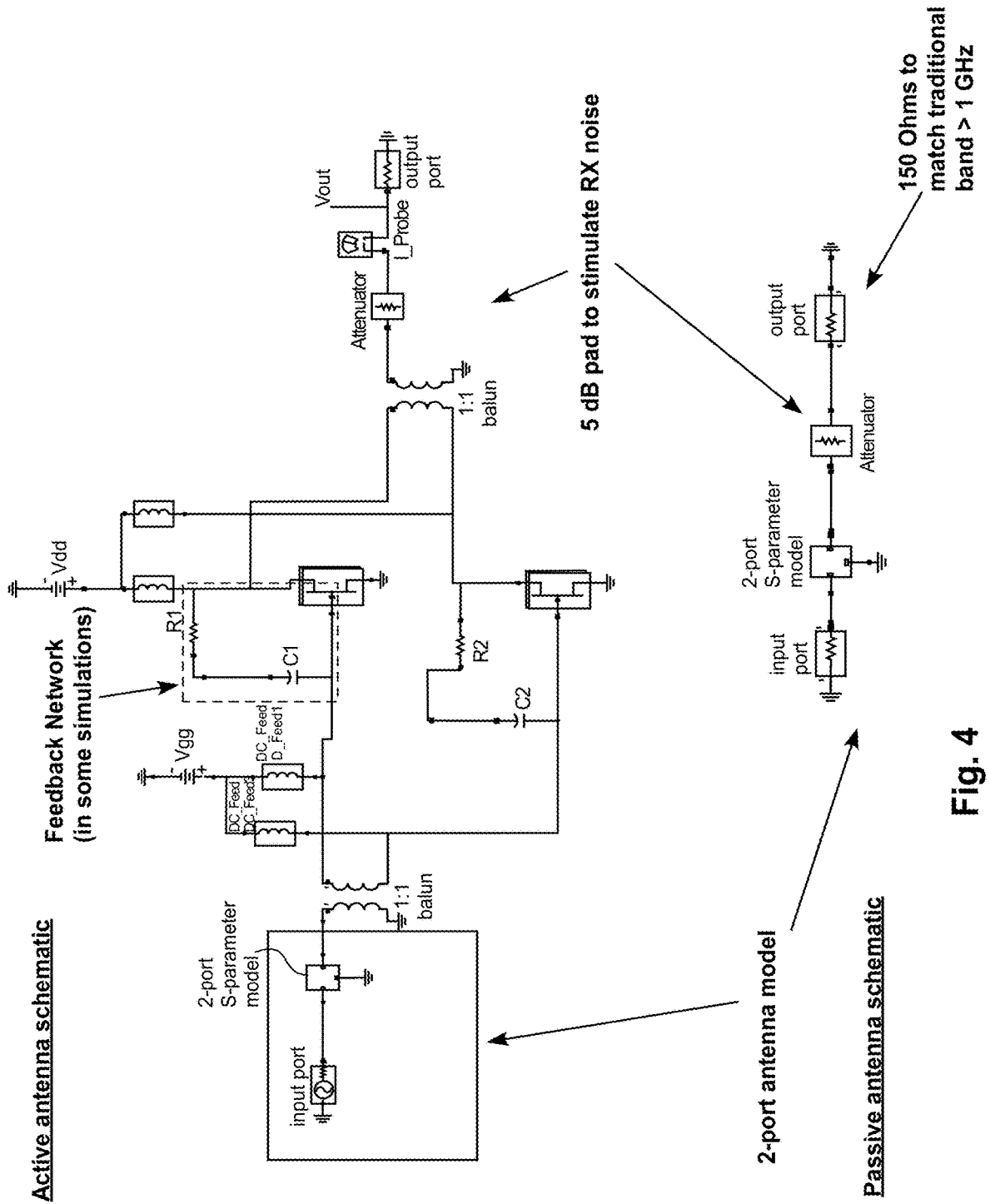
FIG. 4 shows a model used to simulate the effect of the GaN buffer on the receive sensitivity. Full-wave simulations of the antenna were used to compose a 2-port S-parameter model for direct use in the circuit simulator.

Preliminary simulations of this technology have been completed using full-wave simulations of the Vivaldi radiator and foundry-supplied non-linear models of the transistor devices. These models do have a limitation in that they do not account for 1/f noise, which could limit the fidelity of the results at the lowest frequencies. The first step was to convert the simulated radiation pattern and impedance of the radiator and generate a 2-port model of the antenna (see FIG. 4). In this model, S21 is the total antenna efficiency (including impedance match and radiation efficiency), and S22 is the passive antenna reflection coefficient. S21 and the noise figure were evaluated both with and without the buffer. In order to evaluate the impact on the sensitivity, a 5 dB attenuator was inserted after both antennas to account for receiver noise. The input third-order intercept point (IIP3) was also simulated using harmonic balance. The reference plane is the incident wave. The results of these preliminary simulations are presented in FIGS. 5(a) through 6(c).

Figure 5A:
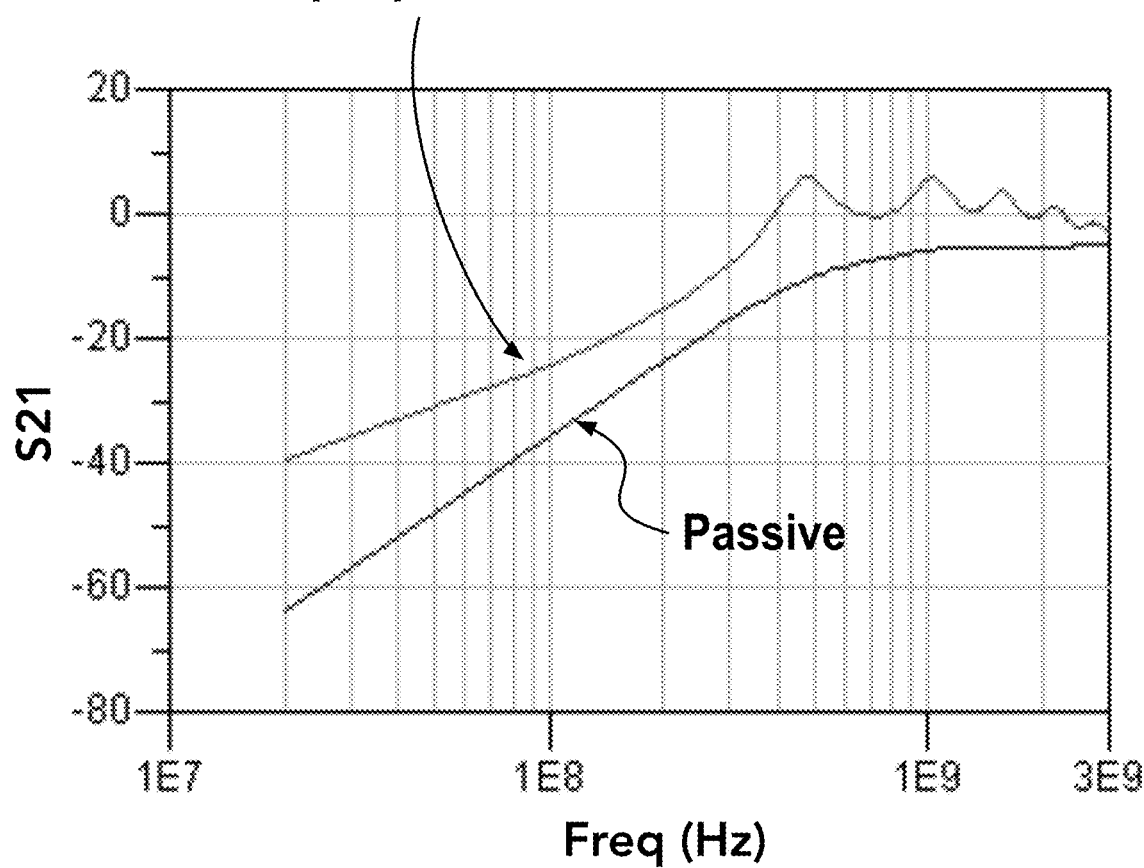
FIGS. 5(a)-5(c) depict simulated comparisons of the Active Vivaldi (with R-C feedback) with the passive Vivaldi. S21 (see FIG. 5(a)) is the ratio of antenna gain (including any amplifier gain and the 5 dB loss of the attenuator) to the antenna directivity. The reference plane for the noise figure (see FIG. 5(b)) is the incident wave. The reference plane for reflection (see FIG. 5(c)) is the antenna terminals for the passive case and the buffer output for the active case. Note: 1/f noise is not included in the model.
Figure 5B:
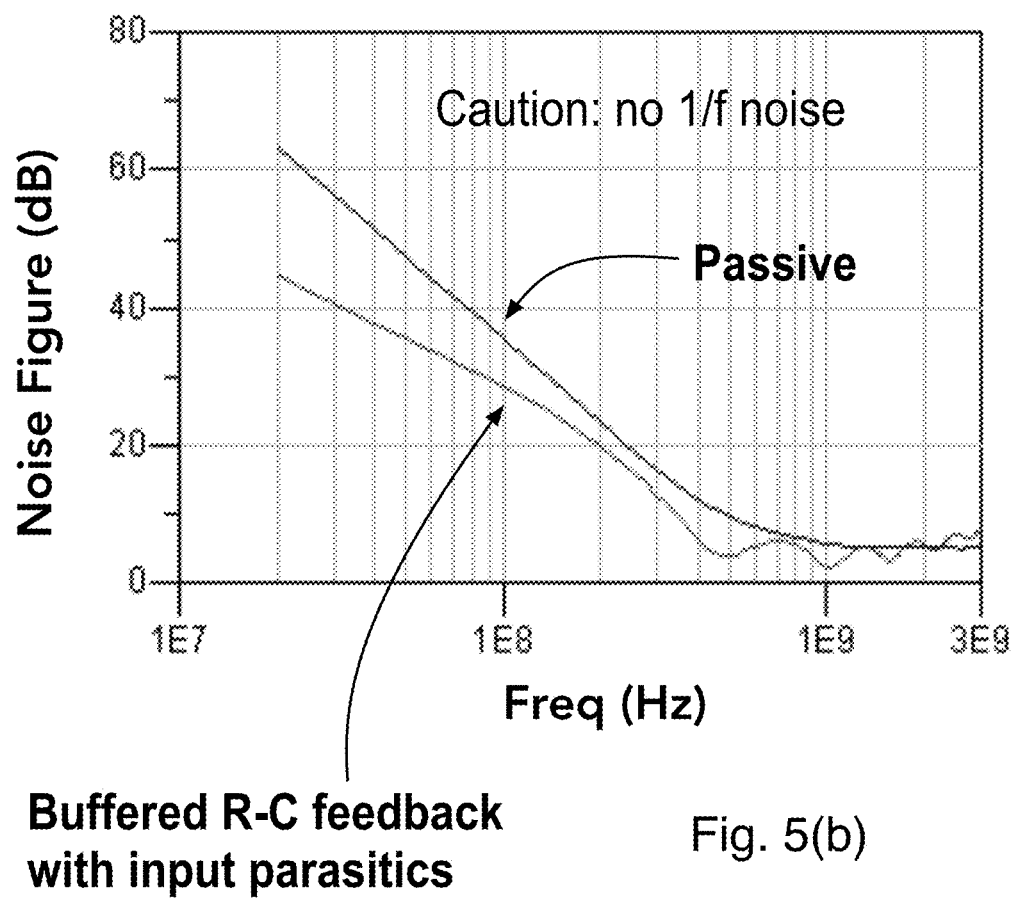
Figure 5C:
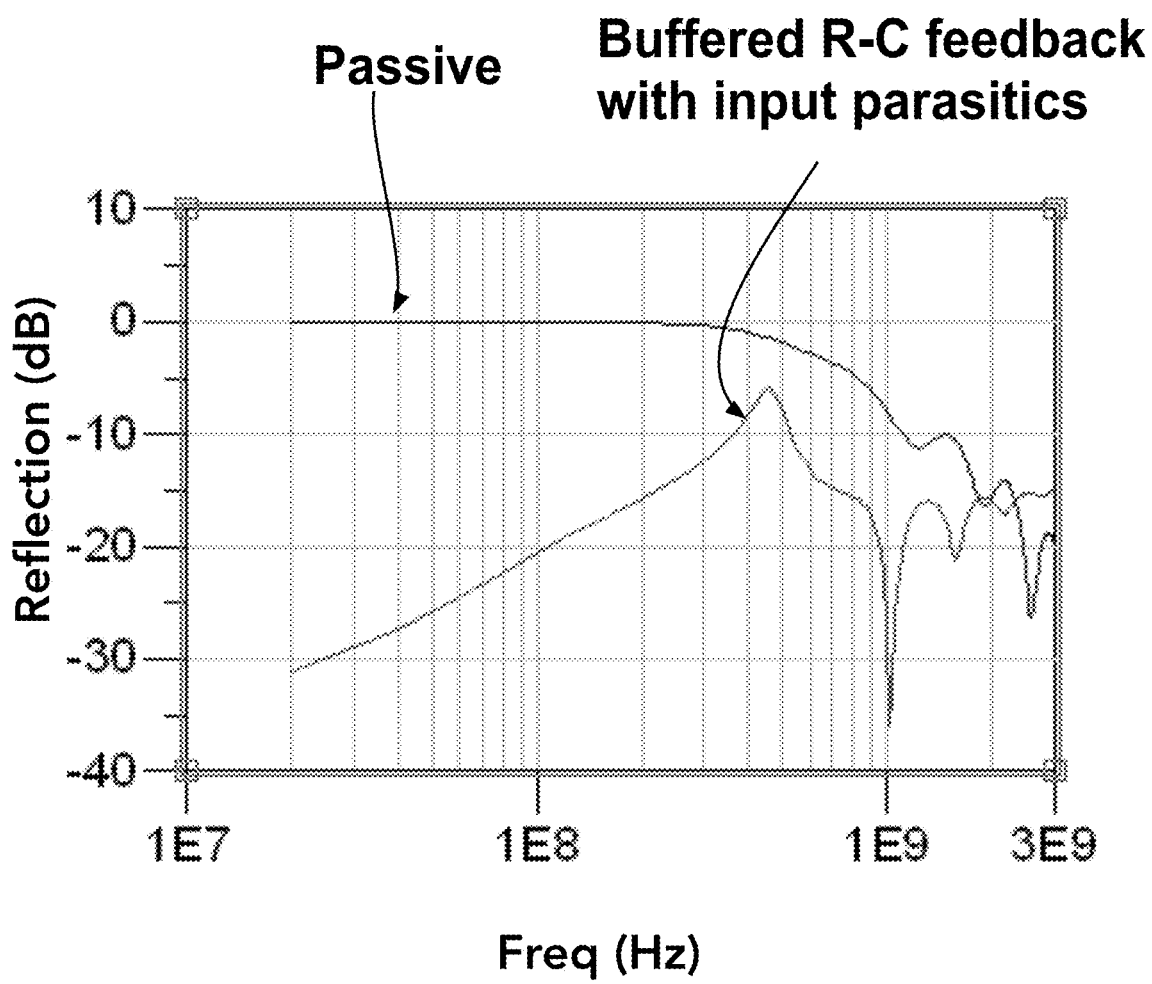

Turning to FIGS. 5(a)-5(c), the Active Vivaldi antenna with buffer amplifiers improves antenna gain by >20 dB at 20 MHz in contrast to a Passive Vivaldi antenna, which rolls off at 40 dB/decade (see FIG. 5(a)). The Active Vivaldi antenna only rolls off at 20 dB/decade. The improvement in Noise Figure (NF) (see FIG. 5(b)) is almost equal to the gain improvement, but is slightly lower. The reason for this is that the buffer has internal noise sources. Finally, the buffer output is impedance matched to 100 Ohms (differential) with reflection <−10 dB over the nearly the entire band, while the passive antenna is only matched in the traditional band (see FIG. 5(c)).

Figure 6A:
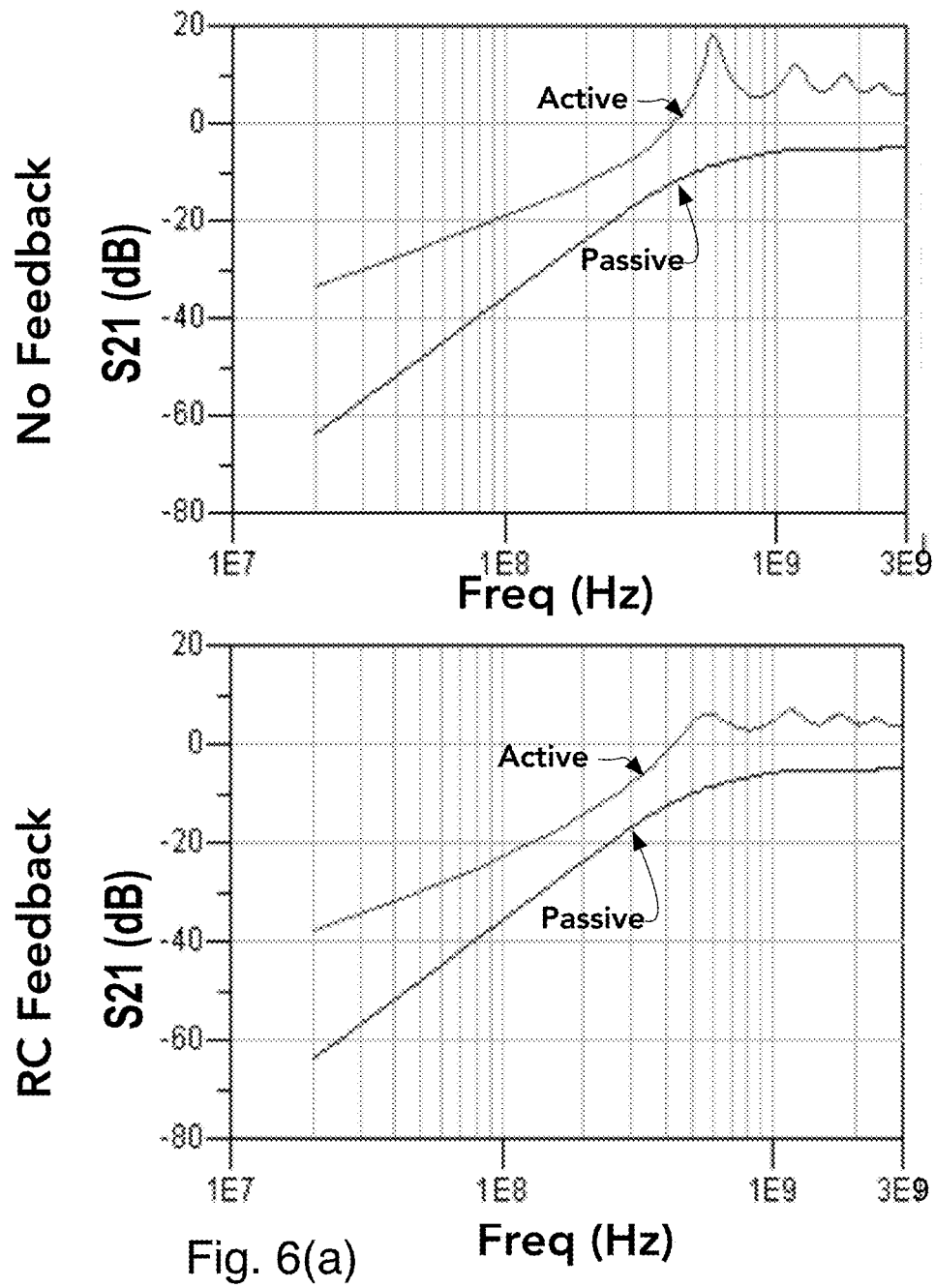
FIGS. 6(a)-6(c) show simulated comparisons of the gain, noise and linearity (input 3rd order intercept point, the reference plane is the incident wave) with and without feedback in the buffer amplifier. The feedback slightly degrades the gain and NF but reduces ripple and improves linearity. Note: 1/f noise is not included in the model.
Figure 6B:
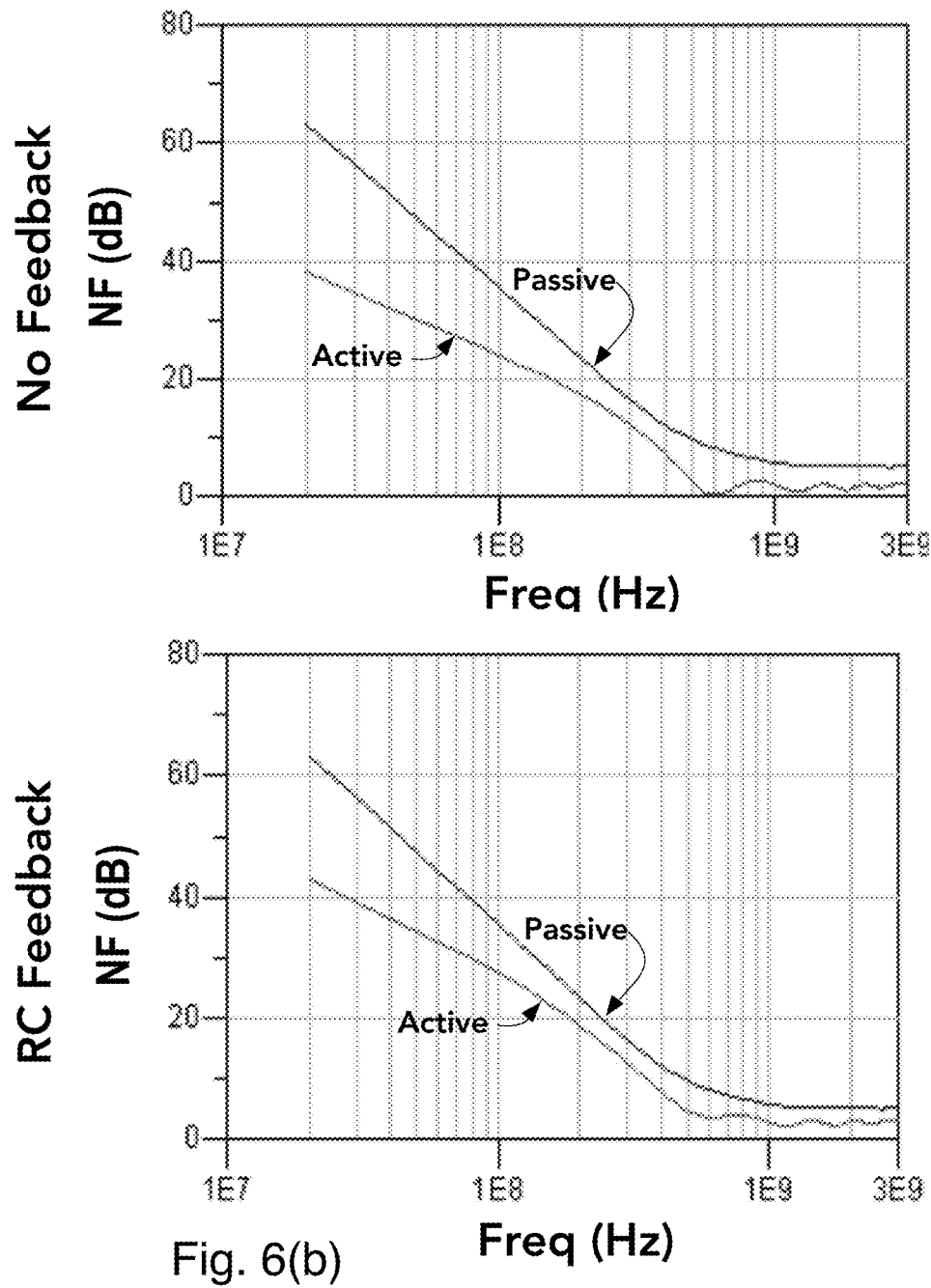
Figure 6C:
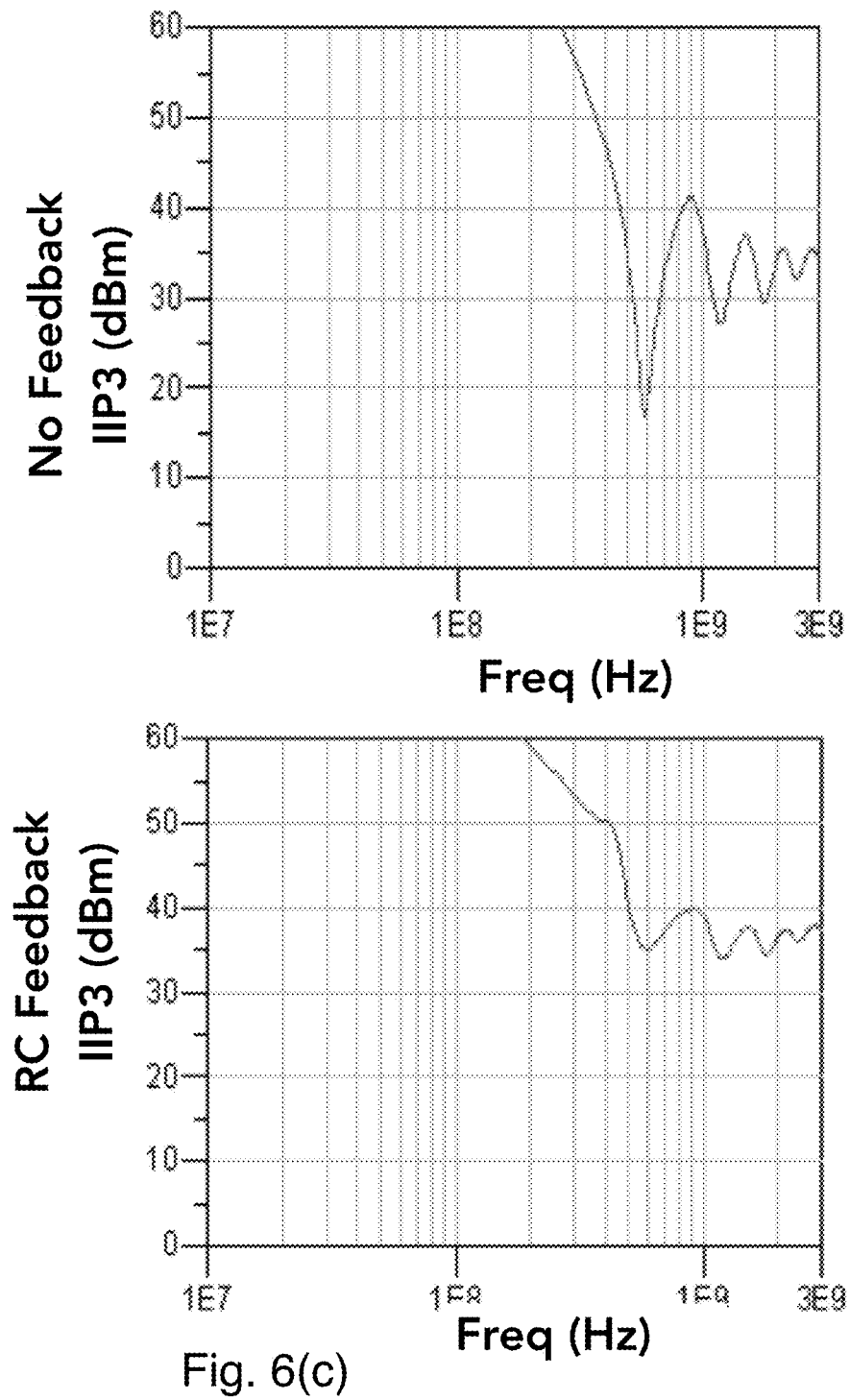

FIGS. 6(a)-6(c) show the benefit of transistorized amplifiers with R-C feedback (see FIGS. 3c and 3d) vs. no-feedback (see FIGS. 3a and 3b) in the buffer amplifier. Without feedback, there is substantial ripple in the transition band, which results in degraded linearity (see FIG. 6(a)). Incorporating feedback degrades the gain and NF very slightly (see FIG. 6(b)), but significantly reduces ripple which, in turn, removes the dips in the IIP3 (see FIG. 6(c)). Therefore, R-C feedback is the preferred for the buffer amplifiers.

The FET devices in the buffer amplifiers are preferably embodied as GaN devices, although other group III-V devices or even silicon devices may be used when desired by those practicing the presently disclosed technology.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Section 112, as it exists on the date of filing hereof, unless the element is expressly recited using the phrase "means for . . . " and no method or process step herein is to be construed under those provisions unless the step, or steps, are expressly recited using the phrase "comprising the step(s) of. . . . "

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

What is claimed is:

1. In combination, a Vivaldi antenna configured to be impedance matched to an antenna impedance Za at and above but not below a frequency fc; a Field-Effect-Transistor buffer coupled to terminals of the Vivaldi antenna, a length of said coupling between the antenna terminals and of the buffer being a distance much less than a wavelength at frequency fc, the buffer configured to present a high input impedance at frequencies substantially <fc, the buffer output impedance further configured to be matched to a system impedance Z0 at frequencies both above and below fc.

2. The combination of claim 1 wherein an input of the Field-Effect-Transistor buffer is coupled to terminals of the Vivaldi antenna and wherein the Field-Effect-Transistor buffer is configured to present said high input impedance at frequencies substantially <fc at the terminals of the Vivaldi antenna.

3. The combination of claim 2 wherein the length of said coupling between the antenna terminals and the buffer being a distance much less than a quarter wavelength at frequency fc.

4. The combination of claim 1 wherein the Field-Effect-Transistor buffer has gate electrodes thereof directly coupled to terminals of the Vivaldi antenna.

5. The combination of claim 4 wherein the Field-Effect-Transistor buffer amplifier is embodied in an IC chip, the IC chip being disposed immediately adjacent the terminals of the Vivaldi antenna to thereby reduce a length of connection between gate electrodes of the Field-Effect-Transistor buffer amplifier and the terminals of the Vivaldi antenna.

6. The combination of claim 2 wherein the buffer comprises GaN FETs.

7. The combination of claim 2 wherein the antenna has a balanced feed and the buffer has a balanced input.

8. The combination of claim 7 wherein the buffer has a differential output.

9. The combination of claim 7 wherein the buffer has a single ended output.

10. The combination of claim 2 wherein the buffer has a high impedance input in an extension band where a size of the Vivaldi antenna is <½ wavelength ($\lambda$) at a minimum frequency and is impedance matched to Za in a traditional band where a size of the Vivaldi antenna is >=½ wavelength ($\lambda$) at said minimum frequency.

11. The combination of claim 10 wherein the buffer includes an RC high-pass feedback network.

12. A Vivaldi antenna system having a pair of antenna arms of a Vivaldi shaped antenna, the antenna arms diverging from each other as they emanate from proximate ends at an antenna throat, a buffer amplifier comprising at least a pair of transistorized amplifiers, the buffer amplifier being embodied in an IC chip and the IC chip being directly bonded to the proximate ends of the antenna arms at said antenna throat, the control electrodes of each of the pair of said transistorized amplifiers being coupled to the Vivaldi shaped antenna.

13. The Vivaldi antenna system of claim 12 wherein the pair of transistorized amplifiers are FET amplifiers which are preferably formed by GaN FET devices and wherein the control electrodes are gates of said FET amplifiers, the gates of said FET amplifiers being operatively coupled to the proximate ends of the antenna arms at the antenna throat.

14. The Vivaldi antenna system of claim 12 wherein the pair of transistorized amplifiers are embodied as common source FET amplifiers having gates operatively coupled to the proximate ends of the antenna arms at the antenna throat.

15. The Vivaldi antenna system of claim 12 wherein the pair of said transistorized amplifiers are disposed less than one quarter of a wavelength of a highest frequency in an extension band of energy, which occurs in the Vivaldi antenna system, from the proximate ends of the antenna arms.

16. A Vivaldi antenna system comprising a Vivaldi type receive antenna that operates both in a "traditional band" of operation, where a size of the Vivaldi type receive antenna is >=½ wavelength ($\lambda$) at a minimum frequency in said "traditional band" of operation and a low-frequency "extension band," where the size of the Vivaldi type receive antenna is <$\lambda$/2, a buffer amplifier having at least a pair of FET amplifiers, the pair of FET amplifiers each having a gate electrode directly coupled to an arm of the Vivaldi type receive antenna, each of the pair of FET amplifiers having an input impedance which is much higher than a characteristic impedance of the Vivaldi type receive antenna in the extension band.

17. The Vivaldi antenna system of claim 16 wherein the FET amplifiers are formed by GaN devices.

18. The Vivaldi antenna system of claim 16 wherein each of the gate electrodes of the FET amplifiers being disposed in close proximity to a respective one of the distal ends the arms of the Vivaldi type receive antenna.

19. A Vivaldi receive antenna system comprising:
a pair of antenna arms of a Vivaldi shaped antenna, wherein the antenna arms diverge from each other as they emanate from proximate ends at an antenna throat, and
an integrated circuit (IC) chip directly bonded at or adjacent the proximate ends of the antenna arms at the antenna throat, the IC chip including a buffer amplifier, the buffer amplifier including one or more amplifier input electrodes associated therewith, the amplifier input electrodes being operatively coupled directly to the antenna arms of the Vivaldi shaped antenna.

20. The Vivaldi receive antenna system of claim 19 wherein the buffer amplifier includes FET devices and wherein the one or more amplifier input electrodes the buffer amplifier comprise gate electrodes of said FET devices.

* * * * *